United States Patent
Byun et al.

(10) Patent No.: US 12,148,947 B2
(45) Date of Patent: Nov. 19, 2024

(54) DEGASSING APPARATUS OF POUCH FOR SECONDARY BATTERY AND DEGASSING METHOD USING THE SAME

(71) Applicants: SK Innovation Co., Ltd., Seoul (KR); RS AUTO Co., Ltd., Chungcheongbuk-do (KR)

(72) Inventors: Jae Gyu Byun, Daejeon (KR); Dong Ju Kim, Daejeon (KR); Jin Go Kim, Daejeon (KR); Seung Noh Lee, Daejeon (KR); Taek Eon Jeong, Daejeon (KR); Deok Kun Kim, Chungcheongbuk-do (KR); Kang Min Lee, Chungcheongbuk-do (KR)

(73) Assignees: SK ON CO., LTD., Seoul (KR); RS AUTO CO., LTD., Chungcheongbuk-do (KR)

( * ) Notice: Subject to any disclaimer, the term of this patent is extended or adjusted under 35 U.S.C. 154(b) by 290 days.

(21) Appl. No.: 17/327,051

(22) Filed: May 21, 2021

(65) Prior Publication Data

US 2021/0367306 A1   Nov. 25, 2021

(30) Foreign Application Priority Data

May 22, 2020   (KR) .................. 10-2020-0061480

(51) Int. Cl.
*H01M 50/308* (2021.01)
*H01M 10/0525* (2010.01)
*H01M 50/105* (2021.01)

(52) U.S. Cl.
CPC ..... *H01M 50/308* (2021.01); *H01M 10/0525* (2013.01); *H01M 50/105* (2021.01)

(58) Field of Classification Search
CPC .. H01M 50/308; H01M 50/105; H01M 50/30; H01M 50/3425; H01M 10/058;
(Continued)

(56) References Cited

U.S. PATENT DOCUMENTS

| 2019/0207241 A1* | 7/2019 | Park ................. H01M 50/3425 |
| 2020/0303786 A1* | 9/2020 | Hong ................ H01M 10/4285 |

FOREIGN PATENT DOCUMENTS

| CN | 104733770 A | 6/2015 |
| CN | 105552441 A | 5/2016 |

(Continued)

OTHER PUBLICATIONS

Edwards Vacuum "nXDS Scroll Pump Instruction Manual". Apr. 25, 2012. Accessed via web on May 12, 2023 at <https://mmrc.caltech.edu/Vacuum/Edwards/nXDSi%20Scroll/A73501880%20-%20Instruction%20Manual.pdf>. (Year: 2012).*

(Continued)

*Primary Examiner* — Jonathan G Leong
*Assistant Examiner* — Drew C Newman
(74) *Attorney, Agent, or Firm* — IP & T GROUP LLP (57) ABSTRACT

A degassing device of a pouch for a secondary battery and a degassing device using the same are provided. The degassing apparatus includes a separation unit including an adsorption plate adsorbing at least one surface of the pouch, and forming a space inside of the pouch by pulling the adsorption plate, and a gas removal unit installed on the adsorption plate, piercing the pouch with a needle having a gas discharge path therein, and removing gas from the pouch through the gas discharge path.

8 Claims, 10 Drawing Sheets

(58) Field of Classification Search
CPC ............. H01M 10/04; H01M 10/0481; H01M 10/0525; H01M 10/0404; B01D 53/02; Y02E 60/10

See application file for complete search history.

(56) References Cited

FOREIGN PATENT DOCUMENTS

| | | | |
|---|---|---|---|
| CN | 108808145 | A | 11/2018 |
| EP | 2648261 | A2 | 10/2013 |
| EP | 3474363 | A1 | 4/2019 |
| EP | 3474364 | A1 | 4/2019 |
| JP | 2000-353547 | A | 12/2000 |
| KR | 2003-0062511 | A | 7/2003 |
| KR | 10-0433836 | B1 | 5/2004 |
| KR | 10-2010-0118394 | A | 11/2010 |
| KR | 10-1304870 | B1 | 9/2013 |
| KR | 101880340 | B1 * | 8/2018 |
| KR | 10-2019-0055595 | A | 5/2019 |
| KR | 10-2020-0004745 | A | 1/2020 |
| KR | 10-2092269 | B1 | 3/2020 |

OTHER PUBLICATIONS

English translation of Dong et al. (CN-105552441-A). (Year: 2016).*
English translation of Kim et al. (KR-101880340-B1). (Year: 2018).*
English translation of Shim et al. (KR-20190055595-A). (Year: 2019).*
English translation of Mao et al. (Mao et al. (CN-108808145-A). (Year: 2018).*
Extended European Search Report issued by the European Patent Office on Sep. 24, 2021.

* cited by examiner

DEGASSING APPARATUS OF POUCH FOR SECONDARY BATTERY AND DEGASSING METHOD USING THE SAME

CROSS-REFERENCE TO RELATED APPLICATION(S)

This application claims the benefit under 35 USC 119(a) of Korean Patent Application No. 10-2020-0061480 filed on May 22, 2020 in the Korean Intellectual Property Office, the entire disclosure of which is incorporated herein by reference for all purposes.

BACKGROUND

1. Field

The present disclosure relates to a degassing apparatus of a pouch for a secondary battery, and more particularly, to a degassing apparatus of a pouch for a secondary battery, in which gas and other foreign substances present in a pouch may be completely removed in a process of manufacturing a pouch for a secondary battery, with a simplified structure, and a degassing method using the same.

2. Description of Related Art

In general, a secondary battery refers to a battery capable of being charged and discharged, unlike a primary battery that cannot be charged, and is widely used in electronic devices such as mobile phones, notebook computers, camcorders and the like, or in electric vehicles or the like.

In detail, lithium-ion secondary batteries have higher capacity than nickel-cadmium batteries or nickel-hydrogen batteries, which are often used as power sources for electronic equipment, and the usage of lithium-ion secondary batteries is rapidly increasing due to high energy density per unit weight.

Lithium-ion secondary batteries mainly use lithium-based oxides and carbon materials as a positive electrode active material and a negative electrode active material, respectively.

A lithium-ion secondary battery includes an electrode assembly in which a positive electrode plate and a negative electrode plate to which a positive electrode active material and a negative electrode active material are applied, respectively, are disposed with a separation unit therebetween, and an exterior material sealing and accommodating the electrode assembly together with an electrolyte solution, for example, a battery case.

The lithium-ion secondary battery may be classified as a can-type secondary battery in which an electrode assembly is embedded in a metal can and a pouch-type secondary battery in which an electrode assembly is embedded in a pouch of an aluminum laminate sheet, depending on the shape of the exterior material.

In manufacturing a pouch-type secondary battery, an electrode assembly including a negative electrode, a separation unit, and a positive electrode is put into an exterior-material pouch, and an electrolyte is injected, and then, the edge is sealed. Then, the battery is activated through several charge/discharge cycles.

In this process, gas may be generated inside of the cell. In this case, in order to collect the generated gas, the pouch-type secondary battery before the activation process has a size of the pouch exterior material larger than the final product.

In the pouch exterior material, a portion formed to be larger than a portion in which the electrode assembly is disposed is referred to as a gas pocket portion, and gas generated during the activation process may be collected in the gas pocket portion.

After the activation process is completed, a hole is formed in the gas pocket portion to drain the gas, and then the gas pocket is cut and the pouch exterior material is resealed according to the final product standard.

On the other hand, when gas exceeding the allowable expansion range of the gas pocket portion is generated during the activation process, the insulation of the sealing portion may be destroyed.

However, since the amount of gas generated during the activation process may vary depending on the material of the electrode assembly and activation conditions, it is not easy to determine the appropriate size of the gas pocket portion.

Accordingly, in the related art, the size of the gas pocket portion is formed to be as large as possible to prevent the insulation of the sealing portion from being destroyed during the activation process.

However, since the gas pocket portion is an unnecessary part to be cut out after the degassing process, manufacturing in a relatively large size is significantly inefficient in terms of production costs.

SUMMARY

This summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a degassing apparatus of a pouch for a secondary battery, capable of completely removing gas, regardless of the size of a cell pocket, and a degassing method using the same.

In addition, an aspect of the present disclosure is to provide a degassing apparatus of a pouch for a secondary battery and a degassing method using the same, in which quality may be guaranteed while lowering the unit cost of a product with a simplified configuration.

According to an exemplary embodiment, a degassing apparatus of a pouch for a secondary battery includes a separation unit including an adsorption plate adsorbing at least one surface of the pouch, and forming a space inside of the pouch by pulling the adsorption plate; and a gas removal unit installed on the adsorption plate, piercing the pouch with a needle having a gas discharge path therein, and removing gas from the pouch through the gas discharge path.

The separation unit may further include a degassing adsorption plate adsorbed to the pouch inside of the adsorption plate, and including a guide hole through which the needle is drawn in and out.

A space between the inside of the adsorption plate, an outside of the degassing adsorption plate and the pouch may have a watertight structure to form a vacuum state.

The separation unit may have an intake hole therein, and the degassing apparatus may further include a foreign matter removal unit connected to the intake hole and discharging foreign matter inside of the separation unit through air suction.

The separation unit may further include a forward and reverse driving unit moving the adsorption plate forward and in reverse, such that respective surfaces of the pouch are spaced apart from each other.

The degassing apparatus may further include a lower adsorption plate disposed below the separation unit and adsorbed on at least one surface of the pouch.

The gas removal unit may include a gas discharge pipe connected to the gas discharge path, a needle driving unit moving the needle to drive the needle to move into or out of the pouch, and a suction control unit connected to the gas discharge path and configured to discharge gas inside of the pouch through air suction when the needle is inserted into the pouch.

The degassing apparatus may further include a adjusting unit varying a withdrawal length of the needle. The adjusting unit may include a guide part coupled to the needle driving unit, a moving part coupled to the gas discharge pipe and capable of moving forwards or in reverse on the guide part, a adjusting guide part coupled to the guide part and including a guide hole, a variable control unit moving the moving part forward while moving along the guide hole, and a spring jointly accommodated in an inner space of the movement guide unit and a moving unit and providing reverse force to a moving unit.

The degassing apparatus may further include at least one fixed adsorption plate adsorbing and fixing the pouch to an opposite surface of the pouch in contact with the separation unit.

The fixed adsorption plate may be fixed or move in a direction opposite to the separation unit. The degassing apparatus may further include a second gas removal unit installed on the fixed adsorption plate, piercing the pouch with a needle having a gas discharge path therein, and removing gas from the pouch through the gas discharge path.

According to an exemplary embodiment, a method of degassing a pouch for a secondary battery includes (a) adsorbing at least one surface of the pouch by an adsorption plate; (b) forming a space inside of the pouch by pulling the adsorption plate by a separation unit; and (c) punching the pouch with a needle having a gas discharge path therein, and then removing gas from the pouch through the gas discharge path.

The forming (b) of a space may further include an operation of adsorbing and pulling a lower portion of the pouch by a lower adsorption plate coupled to a lower side of the separation unit.

The punching (c) of the pouch may further include (c1) moving the needle to insert the needle into the pouch; (c2) discharging gas inside of the pouch through air suction when the needle is introduced into the pouch; and (c3) withdrawing the needle to the outside of the pouch when a preset amount of time has elapsed.

The forming (b) of a space may further include adsorbing and fixing or pulling the pouch by a fixed adsorption plate located on an opposite surface of the pouch in contact with the separation unit.

The punching (c) of the pouch may further include forming a hole in the pouch with a needle installed on the fixed adsorption plate and having a gas discharge path therein, and removing gas from the pouch through the gas discharge path.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

Figure 1:
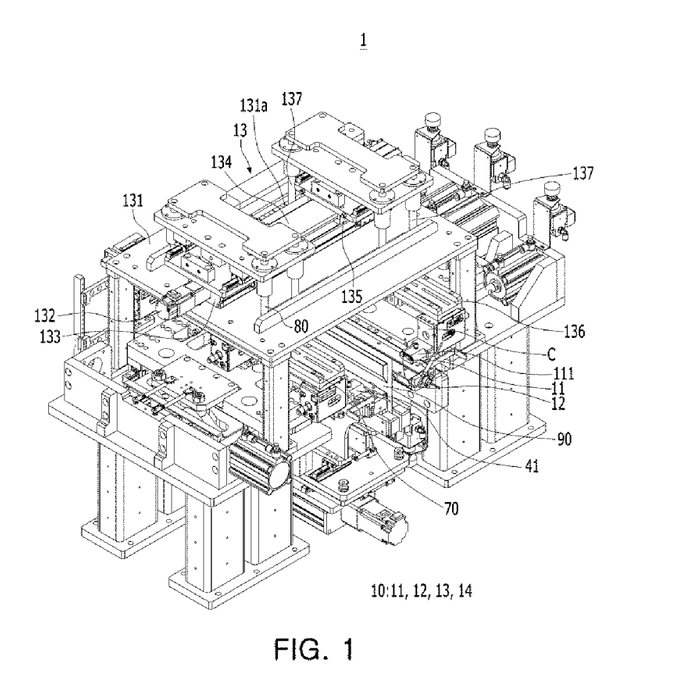
FIGS. 1 and 2 are perspective views illustrating a degassing apparatus of a pouch for a secondary battery according to an exemplary embodiment.
Figure 2:
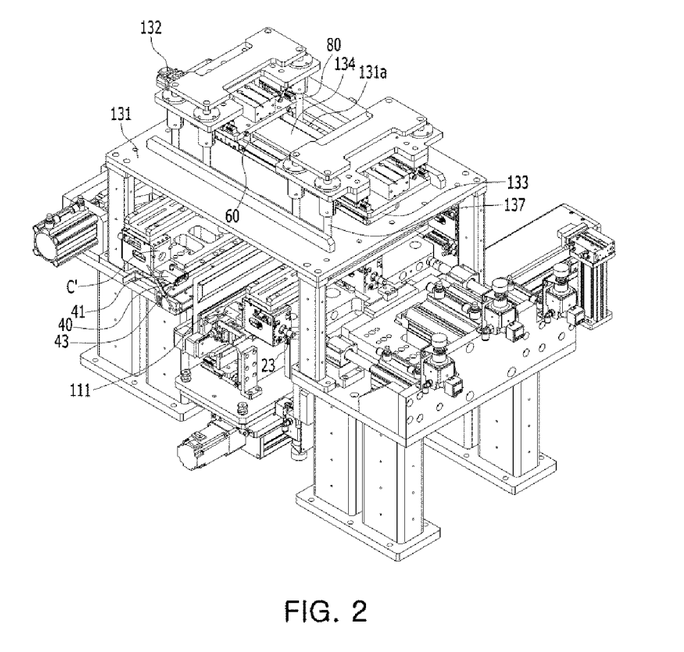
Figure 3:
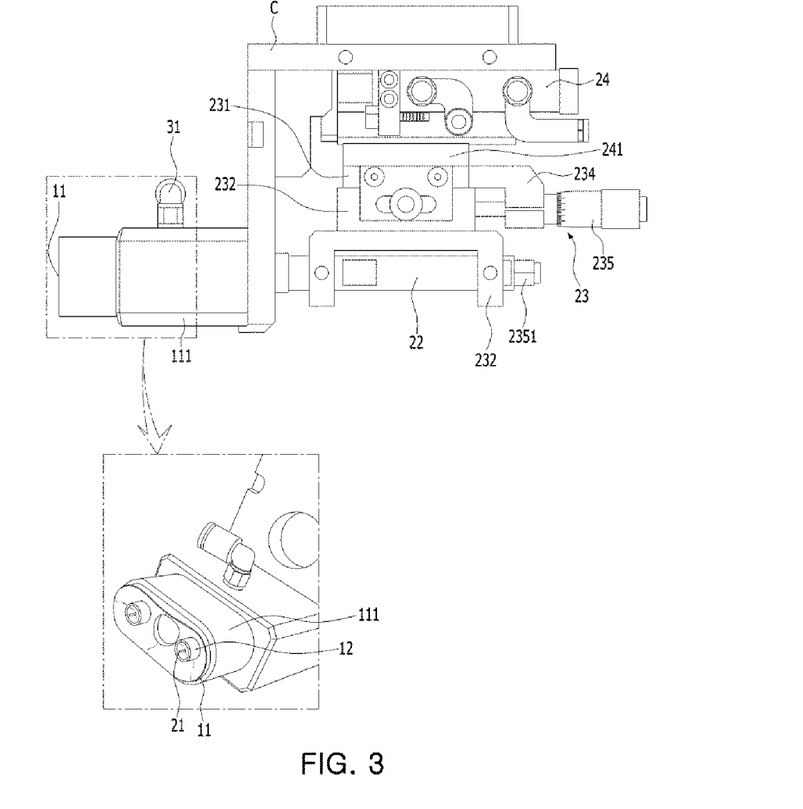
FIG. 3 is a perspective view illustrating a separation unit and a gas removal unit applied to a degassing apparatus of a pouch for a secondary battery according to an exemplary embodiment.
Figure 4:
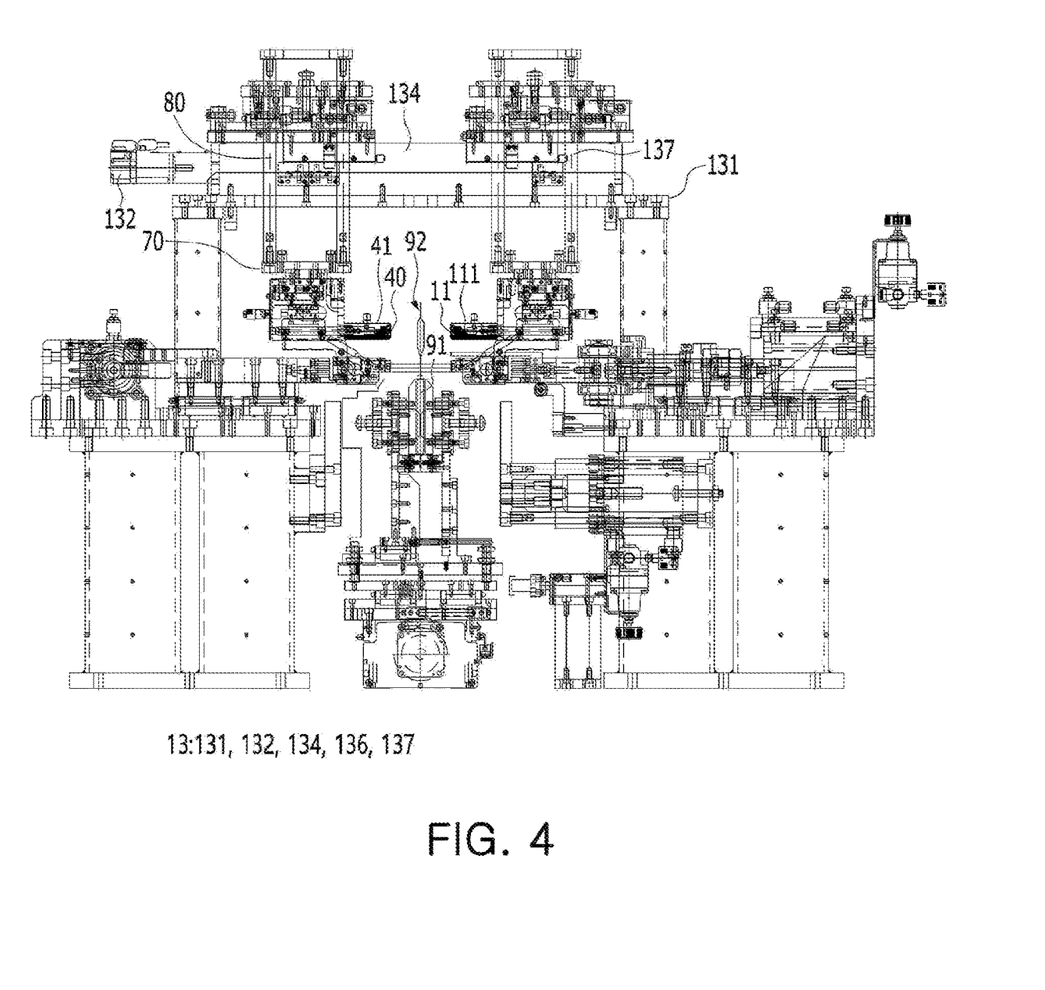
FIG. 4 is a front view illustrating a degassing apparatus of a pouch for a secondary battery according to an exemplary embodiment.
Figure 5:
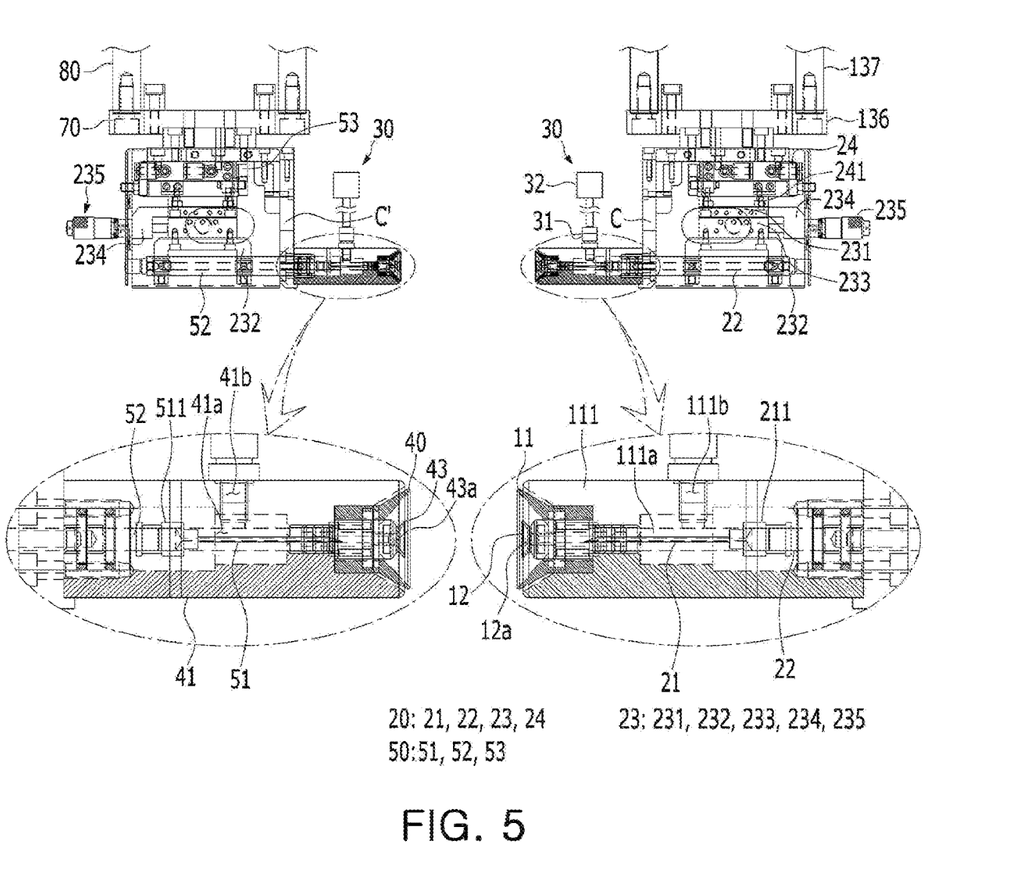
FIG. 5 is a view illustrating a separation unit, a gas removal unit, and a foreign matter removal portion applied to a degassing apparatus of a pouch for a secondary battery according to an exemplary embodiment.
Figure 6:
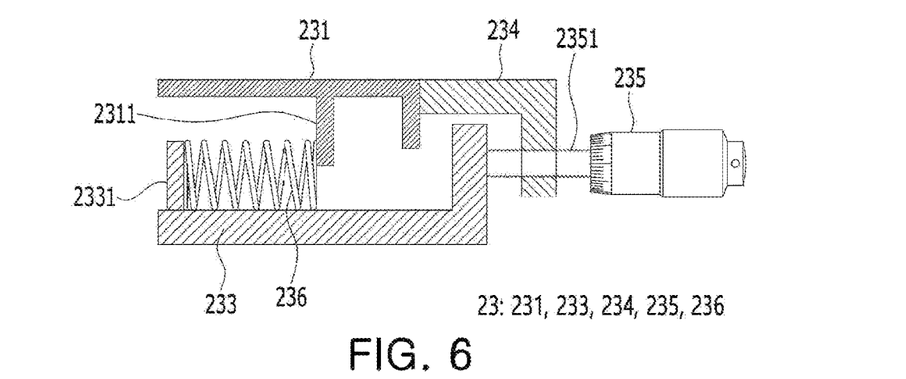
FIG. 6 is a cross-sectional view illustrating an adjusting unit applied to a degassing apparatus of a pouch fora secondary battery according to an exemplary embodiment.

FIGS. 1 and 2 are perspective views illustrating a degassing apparatus of a pouch for a secondary battery according to an exemplary embodiment, FIG. 3 is a perspective view illustrating a separation unit and a gas removal unit applied to a degassing apparatus of a pouch for a secondary battery according to an exemplary embodiment, FIG. 4 is a front view illustrating a degassing apparatus of a pouch for a secondary battery according to an exemplary embodiment, and FIG. 5 is a view illustrating a separation unit, a gas removal unit, and a foreign substance removal unit applied to the degassing apparatus of a pouch for a secondary battery according to an exemplary embodiment. FIG. 6 is a cross-sectional view illustrating an adjusting unit applied to a degassing apparatus of a pouch for a secondary battery according to an exemplary embodiment, and FIGS. 7 to 11 are diagrams illustrating a step-by-step process of removing gas inside of a cell pocket through degassing of a pouch for a secondary battery according to an exemplary embodiment.

A degassing apparatus 1 of a pouch for a secondary battery according to an exemplary embodiment is a product that may completely remove gas and other foreign substances existing inside of a pouch 90 in a process of manufacturing a pouch for a secondary battery (hereinafter referred to as 'pouch'), with a simplified structure.

In this case, the pouch 90 may largely include a cell body 91 and a cell pocket 92.

The cell body 91 and the cell pocket 92 may be integrally formed by sealing edges of first and second surfaces 92a and 92b formed of the same material and size.

Further, the cell main body 91 accommodates an electrode assembly and an electrolyte therein, and the cell pocket 92 is used for removing gas present inside of the cell main body 91.

The degassing apparatus 1 according to an exemplary embodiment may include a separation unit 10 that separates the first surface 92a and the second surface 92b of the cell pocket 92 to remove gas present in the inner space of the cell pocket 92, and a first gas removal unit 20 that removes gas present in the inner space of the cell pocket 92.

The separation unit 10 is provided to separate the first surface 92a and the second surface 92b such that a suction portion 32, to be described later, suctions gas present in the cell pocket 92, and may include at least one of a main body 111, an adsorption plate 11, a degassing adsorption plate 12, a lower adsorption plate 14, and a forward and reverse driving unit 13.

In this case, the number of applications of the separation unit 10 may be increased or decreased depending on the size of the pouch 90.

The main body 111 may be formed to have a polygonal block shape having a predetermined thickness and area.

Inside of the main body 111, an insertion hole 111a into which a first needle 21 and a gas discharge pipe 22, which are parts of the first gas removal unit 20 to be described later, are inserted jointly, and an intake hole 111b in which a foreign matter removal unit 30 to be described later is installed, are formed.

In this case, the insertion hole 111a is formed in the horizontal length direction of the main body 111, and the intake hole 111b is formed in the vertical direction in an upper portion of the main body 111 and is connected to the insertion hole 111a.

Further, the insertion hole 111a may be formed in plural, and the first needle 21 and the gas discharge pipe 22 may respectively be applied in the same number as the insertion hole 111a.

Further, the number of applications of the insertion hole 111a, the first needle 21, and the gas discharge pipe 22 may be changed depending on various conditions such as the size of the pouch 90 when the speed of gas removal is to be increased.

The adsorption plate 11 is formed in front of the main body 111 to separate the first surface 92a from the second surface 92b by interaction with the forward and reverse driving units 13 to be described later.

The adsorption plate 11 may be formed in an elliptical ring shape to be adsorbed to a relatively large area of the first surface 92a, and may be formed along the front edge of the main body 111.

The foreign matter removal unit 30 discharges foreign matter present in the insertion hole 111a of the main body 111 externally.

In detail, the first gas removal unit 20 discharges the gas inside of the cell body 91 through the intake force, and in this process, the electrolyte accommodated in the cell body 91 is also sucked and moved to the insertion hole 111a. In addition, the foreign matter removal unit 30 removes the electrolyte having moved to the insertion hole 111a.

To this end, the foreign matter removal unit 30 may include an intake nozzle 31 installed in the intake hole 111b, and a suction portion 32 connected to the intake nozzle 31.

In this case, the suction portion 32 may be formed of a pump or a known product having air suction function.

Accordingly, when the suction portion 32 operates to generate suction force, the electrolyte and foreign substances on the insertion hole 111a are sucked into the suction portion 32 through the suction nozzle 31.

The degassing adsorption plate 12 is adsorbed on the first surface 92a together with the adsorption plate 11, while being fixed to the adsorption plate 11.

The degassing adsorption plate 12 is applied in two in the same manner as the first needle 21.

A guide hole 12a through which the first needle 21 is drawn in and out is formed in the inside of the degassing adsorption plate 12.

In this case, a connection hole for allowing the first needle 21 to move to the degassing adsorption plate 12 is formed in the front end of the adsorption plate 11, to be located on the same line as the guide hole 12a and the insertion hole 111a.

The degassing adsorption plate 12 may be formed to have an approximately circular ring shape to have excellent adsorption power to the first surface 92a. The degassing adsorption plate 12 may be configured to have gradually decreasing diameter from one end facing the first surface 92a to the other.

The space between the inside of the adsorption plate 11 and the outside of the degassing adsorption plate 12 and the pouch 90, as described above, is formed in a watertight structure to form a vacuum state, such that the first gas removal unit 20 to be described later may completely remove gas inside of the cell pocket 92.

The lower adsorption plate 14 is applied such that the first surface 92a and the second surface 92b of the cell pocket 92 are spaced apart more widely and stably.

The lower adsorption plate 14 is comprised of a pair of lower adsorption plates to face each other with the cell pocket 92 interposed therebetween.

The lower adsorption plate 14 may be formed in the same shape as the adsorption plate 11.

For example, one lower adsorption plate 14 faces the first surface 92a, and the other lower adsorption plate 14 faces the second surface 92b.

In addition, the lower adsorption plate 14 may be disposed at a lower position than the main body 111.

The lower adsorption plate 14 includes a lower body 141, moved forwards or in reverse with respect to the first surface 92a and the second surface 92b, respectively, through a separate driving source.

In this case, although not illustrated in the drawings, the driving source may be formed of a cylinder or a cam, or may be formed of the same product as the forward and reverse driving unit 13 to be described later.

The driving source is operated at the same time as the forward and reverse driving unit 13 to be described later.

For example, when the forward and reverse driving unit 13 advances the adsorption plate 11 and the degassing adsorption plate 12, the driving source advances the lower adsorption plate 14 to be adsorbed onto the first surface 92a, and when the forward and reverse driving unit 13 moves the adsorption plate 11 and the degassing adsorption plate 12 backward, the driving source moves the lower adsorption plate 14 backward such that the first surface 92a and the second surface 92b are separated from each other.

Subsequently, the lower adsorption plate 14 is formed on one end of the lower body 111 and is positioned on a substantially vertical line with the adsorption plate 11 and the degassing adsorption plate 12.

Accordingly, the lower adsorption plate 14 is adsorbed on the first surface 92a together with the adsorption plate 11 when moving forwards, and when moving in reverse, pulls the first surface 92a together with the adsorption plate 11 to be spaced apart from the second surface 92b.

The lower adsorption plate 14 is disposed lower the adsorption plate 11. The lower adsorption plate 14 forms a barrier between the cell body 91 and the inner space formed by the adsorption plate 11. Due to the barrier formed by the lower adsorption plate 14, in the process of inhaling and discharging the gas present in the inner space of the cell pocket 92 through the first needle 21, the electrolyte in the cell body 91 may be prevented from rising to the inner space of the cell pocket 92 and being inhaled by the first needle 21.

In this case, the lower adsorption plate 14 may also be applied to be disposed below a fixed adsorption plate 40 to be described later.

In this case, the lower adsorption plates 14 are disposed to face each other with the cell pocket 92 interposed therebetween, and pull the first surface 92a and the second surface 92b, respectively, to form a wider space in the cell pocket 92.

On the other hand, the above-described main body 111 may be installed in front of a coupler (C) formed in an approximately '⌐'-shaped cross-sectional shape.

The coupler (C) serves as a medium connecting the main body 111 and the forward and reverse driving unit 13.

A connection hole (not illustrated) is formed in the coupler C in a position corresponding to the insertion hole 111a of the main body 111.

The forward and reverse driving unit 13 may include an upper plate 131 moving the adsorption plate 11 and the degassing adsorption plate 12 forward and backward, disposed to be spaced apart from the upper side of the coupler C by a predetermined distance, and provided with rectangular movement guide holes 131a formed on both sides, respectively, a motor 132 installed on the upper surface of the upper plate 131, a case 133 installed on the upper surface of the upper plate 131, a guide rail 134 disposed on the upper side of the case 133, a rotating shaft (not illustrated) accommodated in the case 133, rotated in the forward or reverse direction by the power of the motor 132, and provided with right and left-hand threads that are formed on the right and left sides thereof, respectively, based on the central portion, a slide portion 135 that moves in both directions along the guide rail 134 on the upper surface of the case 133, a mounting ring (not illustrated) formed on the lower side of the slide portion 135, mounted on the outer periphery of the rotating shaft inside of the case 133, and provided with a screw thread that may move in both directions along the right-hand thread of the rotating shaft on the inner periphery thereof, a connection block 136 fixed to the upper surface of the couplers (C), and a connection shaft 137 connecting both sides of the slide portion 135 and the connection block 136, and moving forwards or in reverse on the movement guide hole 131a.

At this time, in an exemplary embodiment of the present disclosure, when the motor 132 rotates the rotating shaft in the forward direction, the mounting ring may advance along the right-hand thread and gradually move toward the central portion of the rotating shaft, and when the motor 132 rotates the rotating shaft in the reverse direction, the mounting ring may move backwards along the right thread and gradually move toward the right side of the rotating shaft.

For example, when the mounting ring is advanced, the slide portion 135, the connection block 136, the connection shaft 137, the coupler (C) and the separation unit 10 are uniformly advanced so that the adsorption plate 11 and the degassing adsorption plate 12 are adsorbed on the first surface 92a. In such a state, when the mounting ring is moved in reverse, the slide portion 135, the connection block 136, the connection shaft 137, the coupler (C) and the separation unit 10 are uniformly retracted, and as a result, the adsorption plate 11 and the degassing adsorption plate 12 pull the first surface 92a to be separated from the second surface 92b.

On the other hand, the first gas removal unit 20 removes gas from the inner space of the pocket portion in which the first surface 92a and the second surface 92b are spaced apart by the separation unit 10 as described above, and may include at least one of the first needle 21, the gas discharge pipe 22, the adjusting unit 23, a first needle driving unit 24, and a first suction control unit 25.

The first needle 21 is provided as a pair of two needles, which are inserted into the insertion holes 111a of the main body 111, respectively.

The needles 21 may be parallel to each other, and may respectively move forwards or in reverse along the insertion hole 111a and the guide hole 12a.

A gas discharge path for discharging the gas in the cell pocket 92 is formed in the first needle 21 in the longitudinal direction.

A part of the gas discharge pipe 22 is inserted into the insertion hole 111a of the main body 111 by penetrating through the connection hole of the coupler C, and the other part protrudes to the outside of the coupler C.

In addition, a mounting pipe 211 provided on the end of the first needle 21 is mounted on the outer periphery of the end of the gas discharge pipe 22.

The internal space of the gas discharge pipe 22 and the gas discharge path of the first needle 21 are connected to each other.

A adjusting unit 23 is applied to a portion of the gas discharge pipe 22, which protrudes to the outside of the main body 111, to vary the withdrawal length of the first needle 21 drawn out of the degassing adsorption plate 12.

The adjusting unit 23 may include at least one of a guide part 231, a bracket 232, a moving part 233, an adjusting guide part 234, a variable control unit 235, and a spring 236, as illustrated in FIG. 6.

The guide part 231 is coupled to a piston 241 of the first needle driving unit 24. Accordingly, the guide part 231 may be advanced or reversed with respect to the first surface 92a.

The guide part 231 may be formed in a polygonal box shape having an open bottom surface and an empty space formed therein, and may be provided with a first support plate 2311 formed in an inner space thereof and supporting the spring 236.

The bracket 232 is formed to have an approximately 'L' cross-sectional shape, and through-holes (not illustrated) through which the gas discharge pipe 22 is installed are formed in the front and rear sides.

The moving part 233 is connected to the guide part 231 and fixed to the bracket 232.

The moving part 233 may be formed in a polygonal box shape with an open upper surface and an empty space formed therein, and in the inner space thereof, a second support plate 2331 is formed to support the spring 236 in a position spaced apart from the first support plate 2311, in the inner space.

The moving part 233 may be movably connected to the guide part 231.

As an example, a rail groove (not illustrated) formed in an approximately 'T' cross-sectional shape is formed in one of lower surface both sides of the guide part 231 and upper surface both sides of the moving part 233, and in the other one, a slide portion 135 (not illustrated) formed in an approximately 'T' cross-sectional shape is formed, such that the moving part 233 may move forwards or in reverse in a sliding manner in the guide part 231.

The adjusting guide part 234 is coupled to the outer surface of the guide part 231 and may be formed in an approximately '⌐'-shaped cross-sectional shape.

A guide hole is formed in a surface of the adjusting guide part 234 facing the moving part 233.

The variable control unit 235 advances the moving part 233 and includes a push portion 2351 that penetrates through the guide hole and contacts the moving part 233.

In this case, threads that mesh with each other are formed on the inner circumference of the guide hole and the outer circumference of the push portion 2351.

Therefore, when the variable control unit 235 is rotated in the forward direction, the push portion 2351 moves forward along the guide hole and pushes the moving part 233 to advance the moving part 233, and as a result, the gas discharge pipe 22 connected via the bracket 232 and the first needle 21 mounted on the gas discharge pipe 22 are advanced.

In addition, when the variable control unit 235 is rotated in the reverse direction, the push portion 2351 is moved in reverse along the guide hole to be spaced apart from the moving part 233.

On the circumferential surface of the variable control unit 235, a scale for numerically displaying the length of the first needle 21 to be drawn out or drawn in and a number corresponding to the scale may be printed.

The spring 236 performs a function of returning the moving part 233 to an original position thereof when the push portion 2351 is spaced apart from the moving part 233, and is accommodated jointly in the inner space of the moving part 233 together with the guide part 231, and both sides thereof are fixed to a first support plate 2311 and a second support plate 2331, respectively.

Accordingly, when the moving part 233 is moved forward by rotating the variable control unit 235 in a forward direction, the first support plate 2311 and the second support plate 2331 are separated from each other, and thus, the spring 236 is expanded, and when the variable control unit 235 is rotated in the reverse direction, the spring 236 is contracted to an original shape and thus, the moving part 233 moves in reverse.

The more the moving part 233 is advanced, the longer the withdrawal length of the first needle 21 with respect to the degassing adsorption plate 12 is, and as the moving part 233 is moved in reverse, the withdrawal length of the first needle 21 with respect to the degassing adsorption plate 12 decreases. Therefore, the withdrawal length of the first needle 21 may be adjusted by controlling the variable control unit 235 according to the thickness of the first surface 92a.

The first needle driving unit 24 is driven to move the first needle 21 to the inside or outside of the cell pocket 92, and may be formed of a rodless cylinder or a hydraulic cylinder.

In the drawings, an example in which the need driving unit 24 is formed of a rodless cylinder is illustrated.

The first needle driving unit 24 has an upper surface fixed to the ceiling surface of the coupler C, and the piston 241 is coupled to the upper surface of a fixing block.

The piston 241 reciprocates in both directions in the longitudinal direction of the first needle driving unit 24 to uniformly advance or reverse the gas discharge pipe 22 and the first needle 21 with respect to the first surface 92a.

At this time, when the first needle 21 is advanced, the front side thereof is withdrawn from the degassing adsorption plate 12 and then penetrates the first surface 92a and is positioned in the inner space of the cell pocket 92.

The first suction control unit 25 discharges gas in the cell pocket 92 and may be formed of a pump or a known product having an air suction function.

The first suction control unit 25 has a suction hose 251 provided therein that is connected to the end of the gas discharge pipe 22, and when the first needle 21 is inserted into the inner space of the cell pocket 92, the first suction control unit 25 sucks the gas present in the inner space of the cell pocket 92 through air intake and discharges the gas externally.

Next, the fixed adsorption plate 40 and a second gas removal unit 50 applied to the pouch 90 according to an exemplary embodiment will be described with reference to FIG. 5.

The fixed adsorption plate 40 adsorbs and fixes the opposite side of the pouch 90 that the adsorption plate 11 contacts, for example, the second surface 92b of the cell pocket 92, such that the separation unit 10 easily pulls the first surface 92a to be spaced apart from the second surface 92b.

The fixed adsorption plates 40 may be applied in the same number as the adsorption plates 11.

The fixed adsorption plate 40 may be formed in an elliptical ring shape to be adsorbed to a relatively large area of the second surface 92b, and may be formed along the front edge of a fixed body 41.

The fixed adsorption plate 40 may further include the fixed body 41 formed in a polygonal block shape.

In addition, an additional degassing adsorption plate 43 having the same shape as the degassing adsorption plate 12 described above may be formed inside of the fixed adsorption plate 40.

A guide hole 43a for guiding the entry and exit of a second needle 51 is also formed in the additional degassing adsorption plate 43.

In an example, the fixed adsorption plate 40 may be adsorbed on the second surface 92b, in a fixed state. In this case, only the adsorption plate 11 and the degassing adsorption plate 12 are advanced and reversed by the above-described forward and reverse driving unit 13 in a state in which the fixed adsorption plate 40 is in contact with the second surface 92b, such that only the first surface 92a is pulled.

At this time, the fixed adsorption plate 40 may prevent the cell pocket 92 from being supported and pushed when the adsorption plate 11 and the degassing adsorption plate 12 pressurize and adsorb the first surface 92a.

Then, the fixed adsorption plate 40 is naturally adsorbed to the second surface 92b by the pressing force of the adsorption plate 11 and the degassing adsorption plate 12.

Accordingly, the fixed adsorption plate 40 holds the second surface 92b when the adsorption plate 11 and the degassing adsorption plate 12 move in reverse.

In another example, the fixed adsorption plate 40 may be advanced or reversed with respect to the second surface 92b at the same time as the adsorption plate 11 through the forward and reverse driving unit 13 as illustrated in FIG. 4.

To this end, the degassing apparatus 1 of a pouch for a secondary battery according to an exemplary embodiment may include an additional slide portion 60 that moves in both directions along the guide rail 134 on the upper surface of the case 133, an additional mounting ring (not illustrated) formed on the lower side of the additional slide portion 60, mounted on the outer periphery of the rotating shaft inside of the case 133, and having a thread that may move in both directions along the left-hand thread of the rotating shaft on the inner periphery thereof, an additional connection block 70 fixed to an upper surface of an additional couplers C' coupled to the fixed body 41, and an additional connection shaft 80 connecting both sides of the additional slide portion 60 and the additional connection block 70 to each other and moving forwards or in reverse on the movement guide hole 131a.

Therefore, when the motor 132 rotates the rotating shaft in the forward direction, the additional mounting ring advances along the left-hand thread and gradually moves toward the center of the rotating shaft, to become closer to the mounting ring, and when the motor 132 rotates the rotating shaft in the reverse direction, the additional mounting ring moves in reverse along the right-hand thread and gradually moves away from the mounting ring. In addition, when the additional mounting ring is advanced, the additional slide portion 60, the additional connection block 70, the additional connection shaft 80, an additional coupler C', and the fixed body 41 are uniformly advanced, such that the fixed adsorption plate 40 is adsorbed on the second surface 92b. In this state, when the additional mounting ring is retracted, the additional slide portion 60, the additional connection block 70, the additional connection shaft 80, the additional coupler C' and the fixed body 41 are uniformly retracted. As a result, the fixed adsorption plate 40 pulls the second surface 92b and separates the second surface from the first surface 92a.

The second gas removal unit 50 may include a second needle 51 that is inserted into an insertion hole 41a of the fixed body 41, has a gas discharge path formed therein and pierces the second surface 92b, a second gas discharge pipe 52 mounted on the additional mounting pipe 511 that is provided on the end of the second needle 51, a second needle driving unit 53 moving the second needle 51 forwards or in reverse with respect to the second surface 92b, and a second suction control unit 54 connected to the second gas discharge pipe 52, suctioning the gas present in the inner space of the cell pocket 92 through air suction, and discharging the sucked air externally.

In addition, a mounting pipe 511 provided on the end of the second needle 51 is mounted on the outer periphery of the end of the second gas discharge pipe 52.

In this case, in the inside of the fixed body 41, an insertion hole 41a into which the second needle 51 and the second gas discharge pipe 52, which are parts of configurations of the second gas removal unit 50 to be described later, are inserted jointly, and an intake hole 41b in which the foreign matter removal unit 30 is installed, are formed.

The insertion hole 41a of the fixed body 41 is formed in the horizontal length direction of the fixed body 41, and the intake hole 41b is formed in the vertical direction in an upper portion of the fixed body 41 and is connected to the insertion hole 41a.

The insertion hole 41a may be formed in plural, and the second needle 51 and the second gas discharge pipe 52 to be described later may be applied in the same number as the insertion hole 41a, respectively.

In addition, the second needle 51 may be configured as a pair of two, similar to the first needle 21, and may be respectively inserted into the insertion hole 41a of the fixed body 41.

Respective configurations and operations of the second gas removal unit 50 described above are the same as those of the first gas removal unit 20 described above, and a detailed description thereof will be omitted.

However, since the intake force generated by the first suction control unit 25 and the intake force generated by the second suction control unit 54 do not necessarily need to be the same, the intake force of the second suction control unit 54 may be set to be lower than the intake force of the first suction control unit 25.

In this case, the first suction control unit 25 sucks a relatively large amount of gas, and the second suction control unit 54 assists the first suction control unit 25 to suck the gas, such that the gags inside of the cell pocket 92 may be sucked and discharged in a relatively faster time.

Next, a gas removal method using the degassing apparatus of a pouch for a secondary battery described above will be described with reference to FIGS. 7 to 11.

Figure 7:
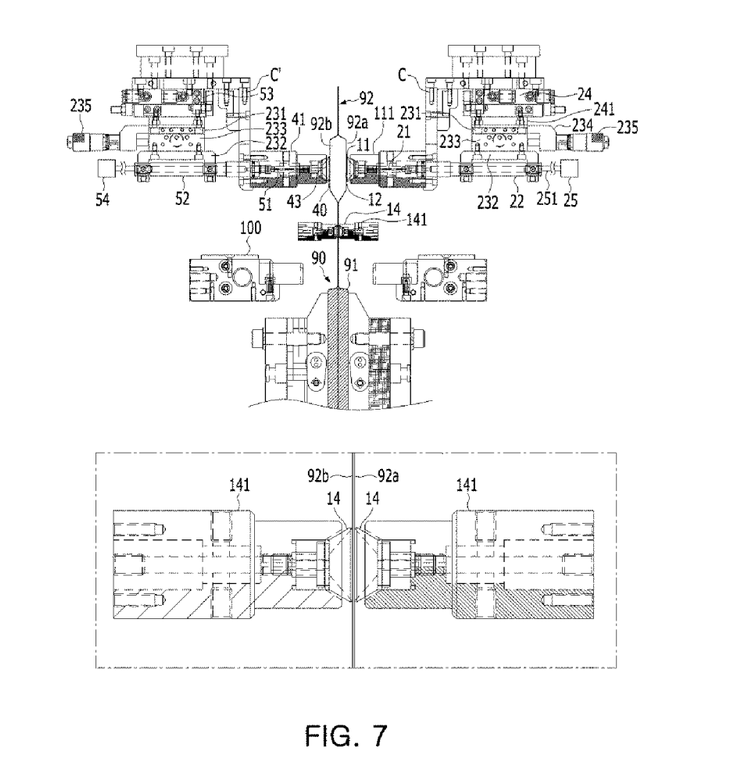
FIGS. 7 to 12 are diagrams illustrating a step-by-step process of removing gas inside of a cell pocket through degassing of a pouch for a secondary battery according to an exemplary embodiment.

In the degassing method of a pouch for a secondary battery according to an exemplary embodiment, first, (a) the adsorption plate 11 is adsorbed on the first surface 92a.

In detail, the adsorption plate 11 is advanced by the forward and reverse driving unit 13 to adsorb the first surface 92a.

In addition, the degassing adsorption plate 12 disposed inside of the adsorption plate 11 and the lower adsorption plate 14 disposed below the adsorption plate 11 are also advanced together with the adsorption plate 11, to respectively adsorb the first surface 92a and the second surface 92b, and the fixed suction plate 40 adsorbs the second surface 92b.

The the fixed adsorption plate 40 supports the second surface 92b, and thus, the adsorption plate 11 may stably adsorb the first surface 92a. Furthermore, the second surface 92b is in close contact with the fixed suction plate 40 by the pressing force generated during the adsorption of the first surface 92a by the adsorption plate 11, and accordingly the fixed suction plate 40 also stably adsorbs the second surface 92b.

Figure 8:
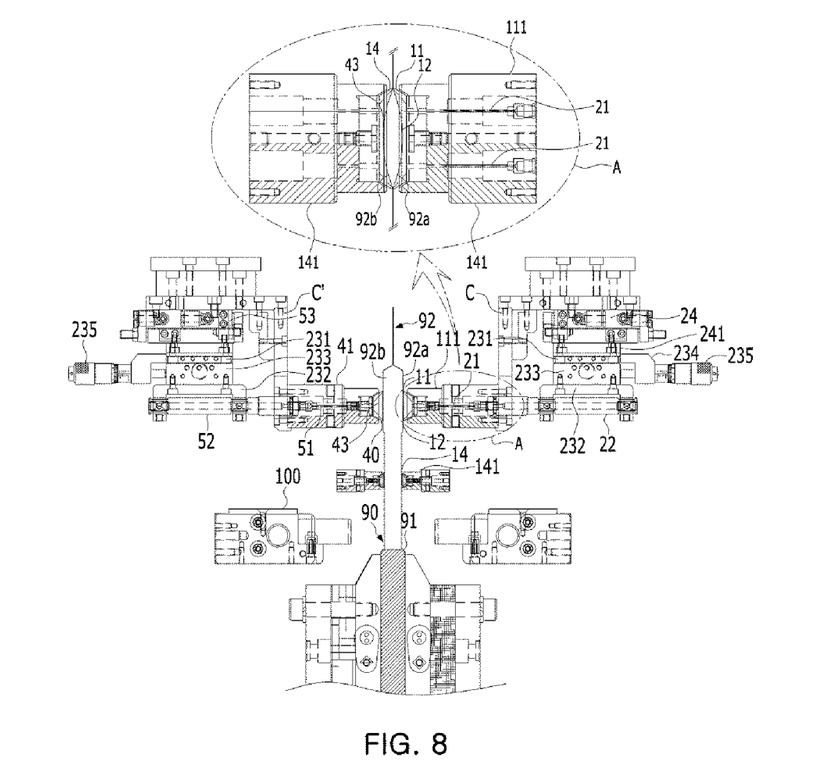

As illustrated in FIGS. 7 and 8, when the fixed adsorption plate 40 is advanced and reversed by the forward and reverse driving unit 13, the adsorption plate 11 and the fixed adsorption plate 40 simultaneously adsorb the first surface 92a and the second surface 92b, respectively.

Thereafter, (b) the adsorption plate 11 and the fixed adsorption plate 40 are respectively pulled to form a space inside of the cell pocket 92.

In detail, the adsorption plate 11 is retracted by the forward and reverse driving unit 13 to pull the first surface 92a, and simultaneously therewith, the fixed adsorption plate 40 supports and adsorbs the second surface 92b as described above, or advances by the forward and reverse driving unit 13 to adsorb the second surface 92b and then moves in reverse to pull the second surface 92b, thereby forming a relatively wider space between the first surface 92a and the second surface 92b.

At this time, since the lower adsorption plate 14 is also retracted and respectively pulls the first and second surfaces 92a and 92b, a barrier is formed in the cell pocket 92, and as a result, the electrolyte in the cell body 91 may be prevented from rising to the position in which the first needle 21 is inserted into the cell pocket 92.

Figure 9:
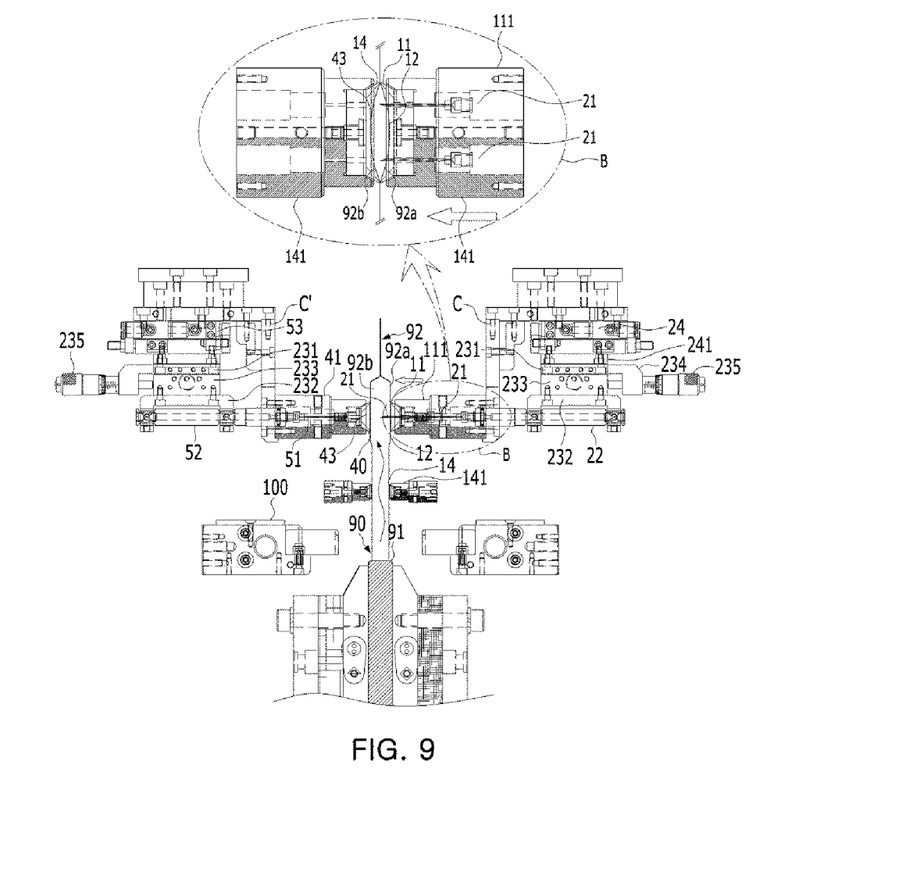

Thereafter, as illustrated in FIG. 9, (c) after punching the first surface 92a with the first needle 21, the gas in the cell pocket 92 is removed by the first suction control unit 25.

In detail, the first needle 21 is advanced by the first needle driving unit 24 to be partially drawn out from the degassing adsorption plate 12 and penetrate through the first surface 92a, to be introduced into the inner space of the cell pocket 92.

Simultaneously therewith, the first suction control unit 25 and the foreign matter removal unit 30 operate at the same time to suck air.

When the first suction control unit 25 inhales air, the gas inside of the cell pocket 92 is sucked into the first suction control unit 25, through the gas discharge path and the gas discharge pipe 22 in sequence.

For example, in a case in which the electrolyte is moved to the insertion hole 111a by the suction force of the first gas removal unit 20, the foreign matter removal unit 30 sucks and removes the electrolyte present in the insertion hole 111a through air suction.

Furthermore, the second gas removal unit 50 also operates together with the first gas removal unit 20 to suck and remove the gas inside of the cell pocket 92. Therefore, the time to remove the gas inside of the cell pocket 92 may be shortened.

Figure 10:
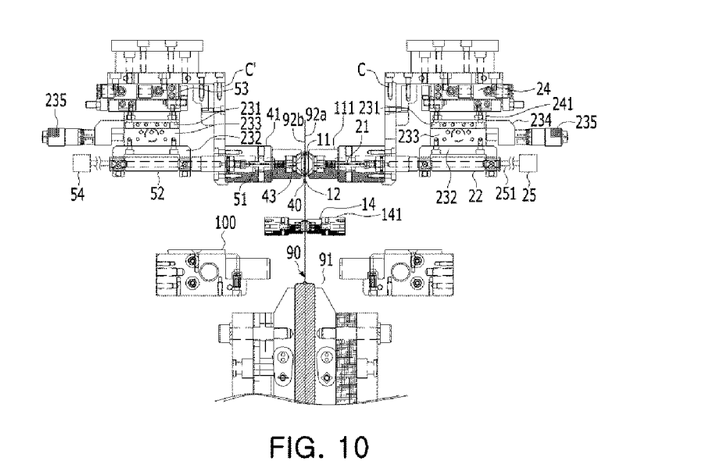
Figure 11:
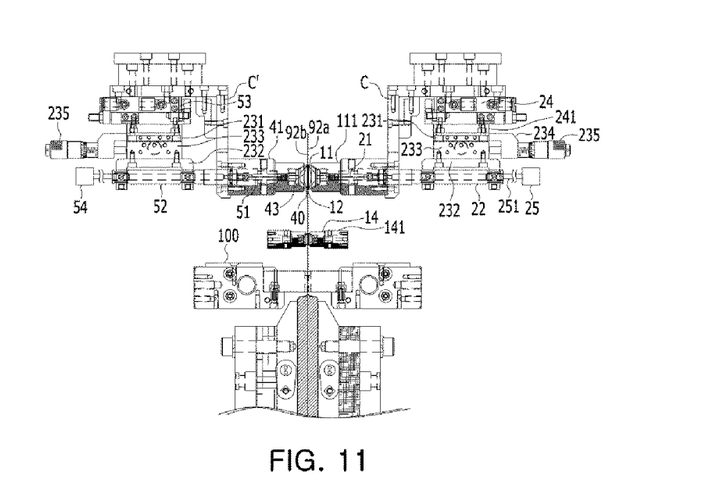

Thereafter, as illustrated in FIG. 10, the forward and reverse driving unit 13 respectively advance the adsorption plate 11 and the fixed suction plate 40, and the driving source advances the lower adsorption plate 14, such that the first surface 92a and the second surface 92b may re-contact each other, and subsequently, as illustrated in FIG. 11, a pair of sealing devices 100 located below the lower adsorption plate 14 advances with respect to the first surface 92a and the second surface 92b to seal a lower portion of the cell pocket 92.

Figure 12:
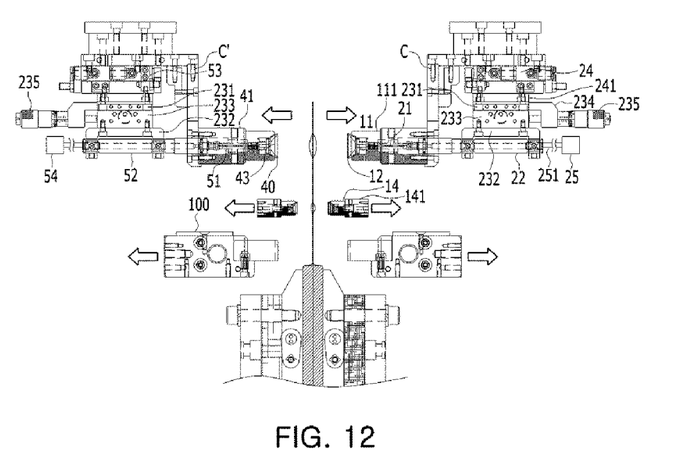

Thereafter, referring to FIG. 12, when the preset amount of time elapses, the first needle driving unit 24 moves the first needle 21 in reverse and to be drawn out of the cell pocket 92, and the forward and reverse driving unit 13 and the driving source respectively move the adsorption plate 11, the fixed adsorption plate 40 and the lower adsorption plate 14 in reverse, to be separated from the first surface 92a and the second surface 92b.

In addition, the sealing device 100 is also moved backwards together with the adsorption plate 11, the fixed adsorption plate 40, and the lower adsorption plate 14.

At this time, the amount of gas generated inside of the cell body 91 varies depending on the size of the pouch 90, and thus, the limit time for the first needle driving unit 24 to move the first needle 21 backwards may be changed in various manners depending on the size of the pouch 90.

As set forth above, a degassing apparatus of a pouch for a secondary battery according to an exemplary embodiment has an effect of completely removing gas, regardless of the size of a cell pocket.

In addition, the simplified configuration has the effect of ensuring quality while lowering the unit cost of the product.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A degassing apparatus of a pouch for a secondary battery, for removing gas from a pouch for a secondary battery with a sealed edge, the degassing apparatus comprising:
 a separation unit including an adsorption plate adsorbing at least one surface of the pouch, and forming a space inside of the pouch by pulling the adsorption plate; and
 a gas removal unit installed on the adsorption plate, piercing the pouch with a needle having a gas discharge path therein, and removing gas from the pouch through the gas discharge path, and
 wherein the separation unit comprises a degassing adsorption plate adsorbed to the pouch inside of the adsorption plate, and including a guide hole through which the needle is drawn in and out, and
 wherein a space between the inside of the adsorption plate, an outside of the degassing adsorption plate and the pouch has a watertight structure to form a vacuum state.

2. The degassing apparatus of claim 1, wherein the separation unit has an intake hole therein,
 wherein the degassing apparatus further comprises a foreign matter removal unit connected to the intake hole and discharging foreign matter inside of the separation unit through air suction.

3. The degassing apparatus of claim 1, wherein the separation unit further comprises a forward and reverse driving unit moving the adsorption plate forward and in reverse, such that respective surfaces of the pouch are spaced apart from each other.

4. The degassing apparatus of claim 1, further comprising a lower adsorption plate disposed below the separation unit and adsorbed on at least one surface of the pouch.

5. The degassing apparatus of claim 1, wherein the gas removal unit comprises,
 a gas discharge pipe connected to the gas discharge path,
 a needle driving unit moving the needle to drive the needle to move into or out of the pouch, and
 a suction control unit connected to the gas discharge path and configured to discharge gas inside of the pouch through air suction when the needle is inserted into the pouch.

6. The degassing apparatus of claim 5, further comprising an adjusting unit configured to adjust a withdrawal length of the needle,
 wherein the adjusting unit includes,
 a guide part coupled to the needle driving unit,
 a moving part coupled to the gas discharge pipe and capable of moving forwards or in reverse on the guide part,
 an adjusting guide part coupled to the guide part and including a guide hole,
 a control unit moving the moving part forward or backward as moving along the guide hole, and
 a spring jointly accommodated in an inner space of the guide part and the moving part and configured to provide restoring force to the moving part.

7. The degassing apparatus of claim 1, further comprising at least one fixed adsorption plate adsorbing and fixing the pouch to an opposite surface of the pouch in contact with the separation unit.

8. The degassing apparatus of claim 7, wherein the fixed adsorption plate is fixed or moves in a direction opposite to the separation unit,
 wherein the degassing apparatus further comprises a second gas removal unit installed on the fixed adsorption plate, piercing the pouch with a second needle having a second gas discharge path therein, and removing gas from the pouch through the second gas discharge path.

* * * * *